United States Patent
Och et al.

(10) Patent No.: US 8,953,885 B1
(45) Date of Patent: Feb. 10, 2015

(54) OPTICAL CHARACTER RECOGNITION

(75) Inventors: Franz Josef Och, Palo Alto, CA (US); Ashok Chhabedia Popat, Menlo Park, CA (US); Dmitriy Genzel, Mountain View, CA (US); Michael E. Jahr, San Francisco, CA (US)

(73) Assignee: Google Inc., Mountain View, CA (US)

( * ) Notice: Subject to any disclaimer, the term of this patent is extended or adjusted under 35 U.S.C. 154(b) by 153 days.

(21) Appl. No.: 13/617,710

(22) Filed: Sep. 14, 2012

Related U.S. Application Data (60) Provisional application No. 61/535,912, filed on Sep. 16, 2011.

(51) Int. Cl.
G06K 9/34 (2006.01)

(52) U.S. Cl.
USPC .......................................................... 382/177

(58) Field of Classification Search
CPC ... G06K 2209/01; G06K 9/6297; G06K 9/00; G06K 9/72
See application file for complete search history.

(56) References Cited

U.S. PATENT DOCUMENTS

| | | | |
|---|---|---|---|
| 5,467,425 A * | 11/1995 | Lau et al. ....................... | 704/243 |
| 5,526,444 A * | 6/1996 | Kopec et al. ................... | 382/233 |
| 5,883,986 A * | 3/1999 | Kopec et al. ................... | 382/310 |
| 6,304,841 B1 * | 10/2001 | Berger et al. ...................... | 704/2 |
| 6,678,415 B1 * | 1/2004 | Popat et al. .................... | 382/226 |
| 6,738,518 B1 * | 5/2004 | Minka et al. ................... | 382/218 |
| 7,110,621 B1 * | 9/2006 | Greene et al. .................. | 382/310 |
| 7,536,295 B2 * | 5/2009 | Cancedda et al. ................. | 704/4 |
| 7,542,893 B2 * | 6/2009 | Cancedda et al. ................. | 704/2 |
| 7,693,842 B2 * | 4/2010 | Hinckley et al. .............. | 707/770 |
| 8,718,375 B2 * | 5/2014 | Ouyang et al. ................ | 382/187 |
| 2007/0150257 A1 * | 6/2007 | Cancedda et al. ................. | 704/2 |
| 2008/0069437 A1 * | 3/2008 | Baker .......................... | 382/159 |
| 2008/0181489 A1 * | 7/2008 | Fu et al. ........................ | 382/159 |
| 2012/0047172 A1 * | 2/2012 | Ponte et al. ................... | 707/776 |
| 2012/0141032 A1 * | 6/2012 | Ouyang et al. ................ | 382/187 |
| 2013/0144593 A1 * | 6/2013 | Och et al. .......................... | 704/2 |
| 2013/0346059 A1 * | 12/2013 | Brants et al. ...................... | 704/2 |

OTHER PUBLICATIONS

Tong et al. "A Statistical Approach to Automatic OCR Error Correction in Context", 1996, Proceedings of the Fourth Workshop on Very Large Corpora (WVLC-4), pp. 88-100.*

Theeramunkong et al. "Offline Isolated Handwritten Thai OCR Using Island-Based Projection with N-Gram Models and Hidden Markov Models", 2002, ICADL 2002, LNCS 2555, pp. 340-351.*

(Continued)

*Primary Examiner* — Vu Le
*Assistant Examiner* — Guillermo Rivera-Martinez
(74) *Attorney, Agent, or Firm* — Remarck Law Group PLC (57) ABSTRACT

Methods, systems, and apparatus, including computer programs encoded on computer storage media, for performing optical character recognition. In one aspect, a method includes receiving a text image I. A set of feature functions are evaluated for a log linear model to determine respective feature values for the text image I, wherein each feature function $h_i$ maps the text image I to a feature value, and wherein each feature function $h_i$ is associated with a respective feature weight $\lambda_i$. A transcription $\hat{T}$ is determined that minimizes a cost of the log linear model.

20 Claims, 7 Drawing Sheets

(56) References Cited

OTHER PUBLICATIONS

Chen et al., "Efficient Automatic OCR Word Validation Using Word Partial Format Derivation and Language Model", 2010, SPIE-IS&T/ vol. 7534, pp. 75340O-1-8.*

Och et al., The Alignment Template Approach to Statistical Machine Translation, 2004, Association for Computational Linguistics, vol. 30, No. 4, pp. 417-449.*

Bazzi, I. et al., "Omnifont and Unlimited-Vocabulary OCR for English and Arabic," Proceedings of the 4th International Conference on Document Analysis and Recognition, vol. 2, pp. 842-846 (1997).

Kopec, G. et al., "Document Image Decoding Using Markov Source Models," IEEE Transactions on Pattern Analysis and Machine Intelligence, vol. 16, No. 6, pp. 602-617, Jun. 1994.

Macherey, W. et al., "Lattice-based Minimum Error Rate Training for Statistical Machine Translation," Proceedings of the 2008 Conference on Empirical Methods in Natural Language Processing, Association for Computational Linguistics, pp. 725-734, Honolulu, Oct. 2008.

Och, F. et al., "The Alignment Template Approach to Statistical Machine Translation," Computational Linguistics, vol. 30, No. 4, pp. 417-449 (2004).

Tromble, R. et al., "Lattice Minimum Bayes-Risk Decoding for Statistical Machine Translation" Proceedings of the 2008 Conference on Empirical Methods in Natural Language Processing, Association for Computational Linguistics, pp. 620-629, Honolulu, Oct. 2008.

* cited by examiner

OPTICAL CHARACTER RECOGNITION

CROSS-REFERENCE TO RELATED APPLICATIONS

This application claims the benefit of U.S. Provisional Application No. 61/535,912, filed on Sep. 16, 2011. The entire disclosure of the above application is incorporated herein by reference.

BACKGROUND

This specification relates to optical character recognition.

Optical character recognition (OCR) uses computer software to process digital images of printed, typewritten, handwritten, or other written text, whether originally on paper, microfilm, or other medium, and to produce text from the images. The digital image of a document processed by an OCR engine may include images of multiple pages of written material. The images of the text to be processed by the OCR engine may be obtained by various imaging methods including using an image scanner to capture digital images of the text.

SUMMARY

In general, one innovative aspect of the subject matter described in this specification can be embodied in methods that include the actions of receiving a text image divided into one or more image segments; evaluating a set of feature functions for a log linear model to determine respective feature values for each image segment of the text image, wherein each feature function $h_i$ maps each image segment $S_i$ to a feature value, and wherein each feature function $h_i$ is associated with a respective feature weight $\lambda_i$; identifying one or more candidate characters for each image segment, wherein the candidate characters are identified using the determined feature values for the corresponding image segment, and wherein each identified candidate character has an associated score determined according to feature functions and weights of the log linear model, and wherein the candidate characters are identified using a feature table that stores co-occurrence counts between characters and feature values, wherein feature values in the feature table comprise a first feature value computed from a co-occurrence count of a character $t_i$ in training data with a k-th row or column projection $p_k$ of an image segment $S_i$ corresponding to character $t_i$, wherein the first feature value is based at least on part on:

$$\log(\text{Count}(p_k(S_i), t_i)),$$

wherein feature values in the feature table comprise a second feature value computed based on a character language model, wherein the second feature value corresponds to a probability for a given input character based one or more previous characters; and determining, by application of a search function, a transcription that minimizes a cost for the text image according to the log linear model, wherein the transcription is a sequence of identified candidate characters, one candidate character for each image segment, wherein the search function performs a beam search through a lattice of nodes and directed edges, wherein each node corresponds to one of the identified candidate characters and each edge to a node is associated with the score associated with the node. Other embodiments of this aspect include corresponding systems, apparatus, and computer programs recorded on computer storage devices, each configured to perform the actions of the methods.

In general, another innovative aspect of the subject matter described in this specification can be embodied in methods that include the actions of receiving a text image I; evaluating a set of feature functions for a log linear model to determine respective feature values for the text image I, wherein each feature function $h_i$ maps the text image/to a feature value, and wherein each feature function $h_i$ is associated with a respective feature weight $\lambda_i$; and determining a transcription $\hat{T}$ that minimizes a cost of the log linear model.

These and other embodiments can each optionally include one or more of the following features. Determining a transcription $\hat{T}$ comprises determining a transcription $\hat{T}$ that minimizes a cost for the log linear model over transcriptions T according to:

$$\hat{T} = \underset{T}{\text{argmax}} \sum_{i=1}^{M} \lambda_i h_i(T, I).$$

Determining a transcription $\hat{T}$ comprises determining a transcription $\hat{T}$ that minimizes a cost for the log linear model over pairs of transcriptions T and image segmentations S according to:

$$\hat{T} = \underset{T,S}{\text{argmax}} \sum_{i=1}^{M} \lambda_i h_i(T, S, I).$$

The actions further include identifying one or more candidate characters for each of one or more image segments of the text image, wherein the candidate characters are identified using the determined feature values for the corresponding image segment, and wherein each identified candidate character has an associated score determined according to the log linear model, and wherein determining, by result of a search function, a transcription T comprises identifying a sequence of identified candidate characters, one candidate character for each image segment, that produces a highest transcription score. The actions further include identifying one or more candidate characters for each of one or more image segments of the text image, wherein the candidate characters are identified from a set of candidate transcriptions, and wherein each identified candidate character has an associated score determined according to the log linear model, and wherein determining, by result of a search function, a transcription T comprises identifying a sequence of identified candidate characters, one candidate character for each image segment, that produces a highest transcription score. The identified candidate characters are identified from a feature table that stores co-occurrence counts between characters and feature values. Feature values in the feature table comprise a first feature value computed from a co-occurrence count of a character $t_i$ in training data with a k-th row or column projection $p_k$ of an image segment $S_i$ corresponding to character $t_i$. The first feature value is given by a first feature function defined by:

$$\log \frac{\text{Count}(p_k(S_i), t_i)}{\text{Count}(P_k(S_i))}.$$

The first feature value is given by a first feature function defined by:

$$\log \frac{\text{Count}(p_k(S_i), t_i)}{\text{Count}(t_i)}.$$

The search algorithm performs a beam search through a lattice, wherein the lattice comprises nodes of each of the identified candidate characters for each image segment and edges of each associated score. The feature functions comprise a first feature function that is based on a character language model, wherein a first feature value for the first feature function corresponds to a probability for a given input character based one or more previous characters. The feature functions comprise a first feature function that is based on a document image decoding model. The feature functions comprise a first feature function that is based on a hidden Markov model.

Using a log linear model for OCR facilitates combination of multiple disparate feature functions. The log linear model allows feature functions to be incorporated rapidly, allowing adaptation of the system to other languages and writing systems. The feature functions can be of substantially different types yet can be combined in a systematic and principled way. Weights assigned to each feature function can be used to adapt the system to the particular input images being analyzed.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
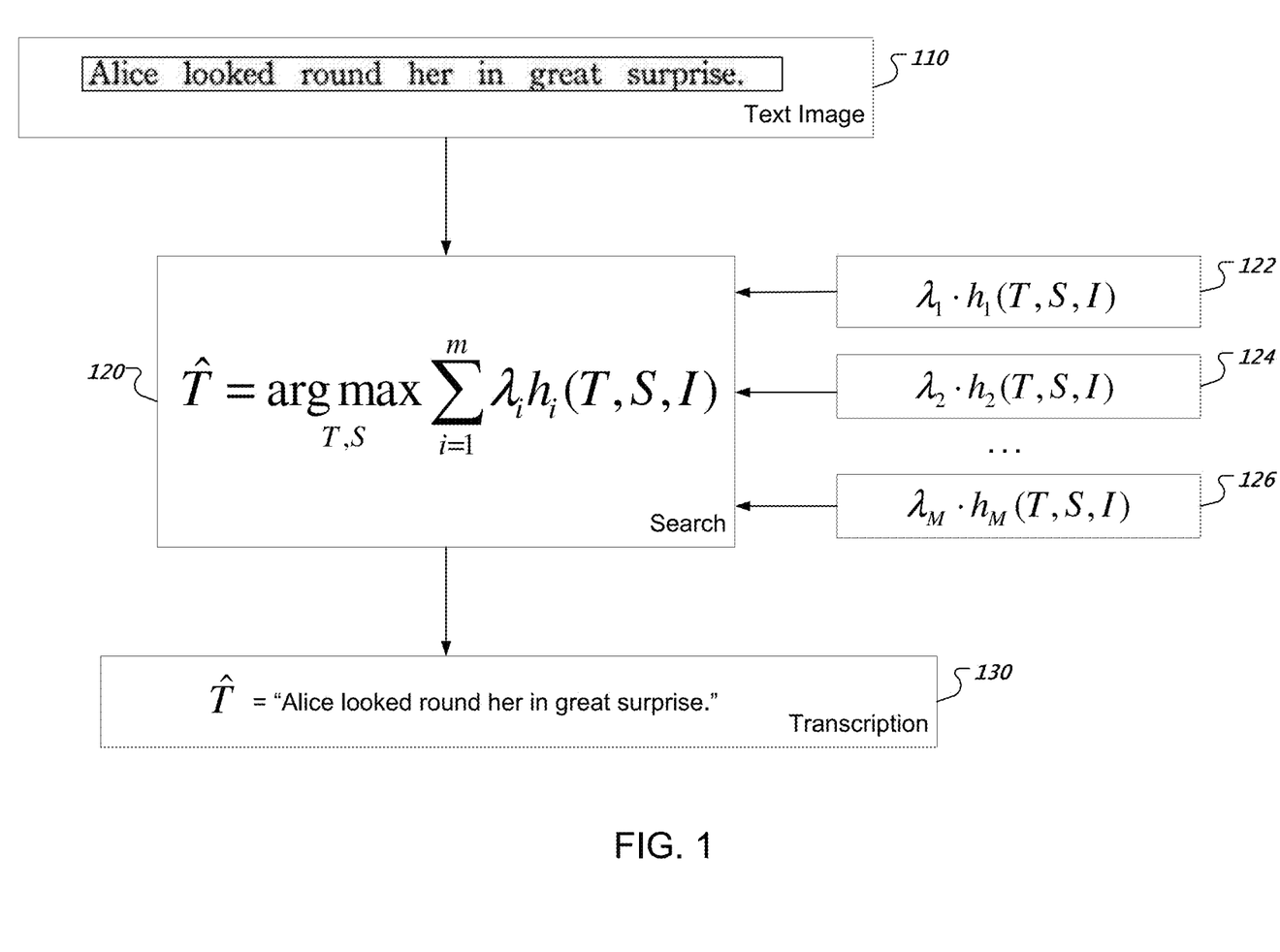
FIG. 1 is an architecture diagram of an example optical character recognition system according to embodiments of the described subject matter.

FIG. 1 is an architecture diagram of an example optical character recognition (OCR) system. An input text image 110 is an image (e.g. a digital image) of a single line of text in a single language. For the given input text image 110, a search 120 is performed using multiple feature functions 122, 124, and 126 to find a transcription 130. The transcription 130 is a sequence of characters in the text image 110, and can be output by the system as, e.g., a sequence of character codes.

The problem of finding the most likely transcription $\hat{T}$ for a given text image can be specified by a log linear model:

$$\hat{T} = \underset{T}{\operatorname{argmax}} P(T \mid I)$$

$$= \underset{T}{\operatorname{argmax}} \frac{\exp\left(\sum_{i=1}^{M} \lambda_i h_i(T, I)\right)}{\sum_{T} \exp\left(\sum_{i=1}^{M} \lambda_i h_i(T, I)\right)}.$$

In other words, given a text image I, the OCR system searches for the transcription T that results in the highest probability.

The system can identify a most likely transcription by computing a transcription score for each of multiple candidate transcriptions. The transcription score may, but need not, represent a probability. The search problem of finding the transcription with a highest transcription score, where the score is computed from multiple distinct feature functions, can be specified by:

$$\hat{T} = \underset{T}{\operatorname{argmax}} \sum_{i=1}^{M} \lambda_i h_i(T, I),$$

where each feature function $h_i(T, I)$ has an associated weight $\lambda_i$.

Context-dependent feature functions can also be used to identify a transcription $\hat{T}$ with the highest transcription score. One such context-dependent feature function is a character language model, which can be used to compute a feature value for a given character that corresponds to a probability, based on one or more previous characters:

$$h_{LM}(T, I) = \log P(T) = \log \prod_{i=1}^{n} P(t_i \mid t_0 \ldots t_{i-1}).$$

The character language model can be used to compute a probability for character $t_i$ given a sequence of previous characters $t_0 \ldots t_{i-1}$, e.g., characters in a determined transcription for an image segment. This feature is by definition context dependent, i.e., it cannot be evaluated for $t_i$ independently of the preceding hypothesized transcription elements. Many other features can be so decomposed. Thus, instead of maximizing over all transcriptions T, one can maximize over pairs of (T, S):

$$\hat{T} = \underset{T,S}{\operatorname{argmax}} \sum_{i=1}^{M} \lambda_i h_i(T, S, I),$$

for each of M feature functions, e.g., feature functions 122, 124, and 126.

Figure 2:
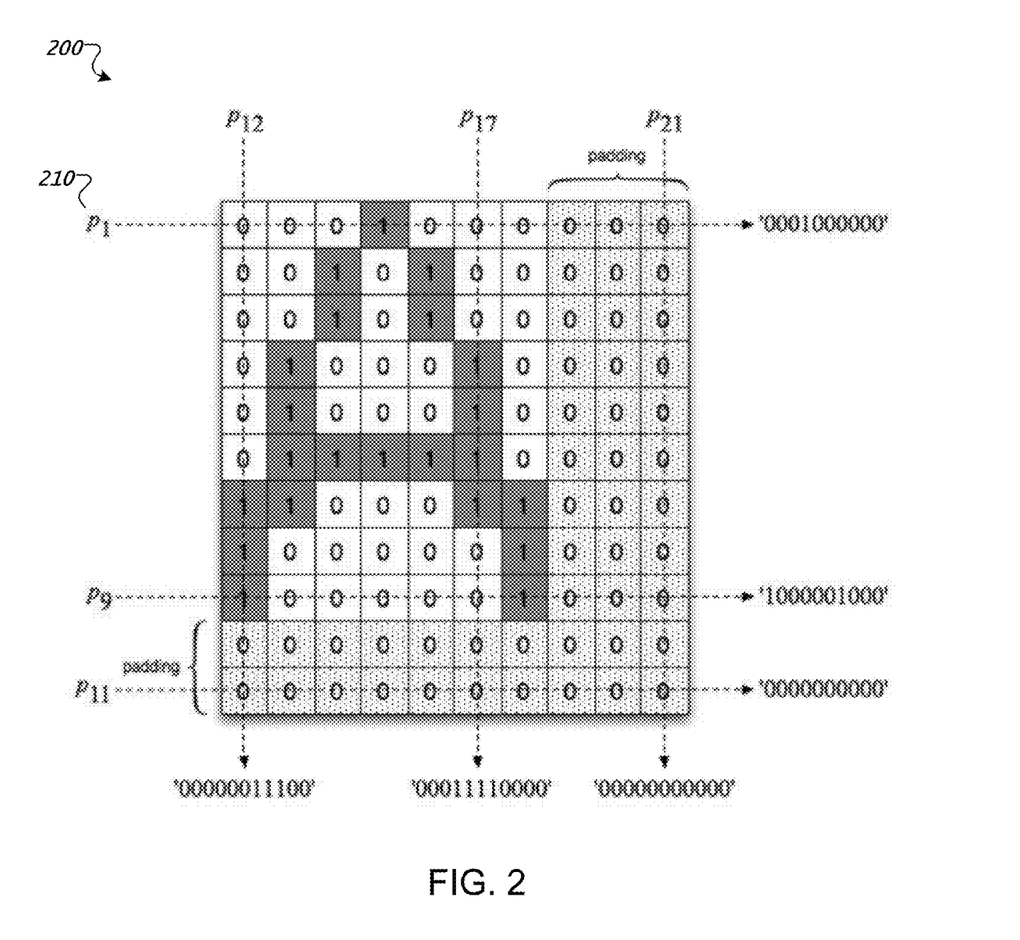
FIG. 2 illustrates row and column projections of an image segment according to embodiments of the described subject matter.

FIG. 2 illustrates row and column projections of an image segment 200. The log linear model as described above allows the combination of multiple feature functions $h_i$, each with an associated weight $\lambda_i$. Feature functions can be defined that use such row and column projections $p_k$ for a given image segment $S_i$. Each projection $p_k$ encodes pixel row or column information for a given image segment.

In some implementations, the image segment is binarized by converting each pixel into either a black pixel or a white pixel. Projections of pixel rows and columns of the binarized image can be generated by encoding black pixels as 1's and white pixels as 0's. For example, projection 210 ("$p_1$") encodes the top-most row of image segment 200. In some implementations, the encoded row data is padded with 0's so that the projection has a predefined width. In this example, projection 210 $p_1(S_i)$ gives an encoded value of "0001000000." Other row and column projections can similarly be used to generate N projections for image segment 200.

The projections can be used to define feature functions that are based on co-occurrence counts of characters and projections. Two such feature functions that can be used to compute co-occurrence counts between a particular character $t_i$ and a projection $p_k$ of a given image segment $S_i$ are $h_{k,CEF}$, given by:

$$h_{k,CEF}(T, S, I) = \sum_{i=1}^{n} \log \frac{\text{Count}(t_i, p_k(S_i))}{\text{Count}(p_k(S_i))},$$

and $h_{k,CFE}$, given by:

$$h_{k,CFE}(T, S, I) = \sum_{i=1}^{n} \log \frac{\text{Count}(t_i, p_k(S_i))}{\text{Count}(t_i)}.$$

Many other types of feature functions can be defined for a given input text image, including a character language model as described above. The number of characters in the text image can also be used as a feature function. In addition, feature functions based on conventional OCR approaches can be defined and incorporated into the system as other independent feature functions. The log linear framework of the OCR system allows any number of such feature functions to be incorporated into the system. For example, feature functions can be defined according to the template-oriented Document Image Decoding approach to OCR, as well as the pixel-column-oriented Hidden Markov Model approach to OCR. Document Image Decoding feature functions return log-likelihood scores that represent a degree to which a character-shape template fits the data locally. Hidden Markov Model feature functions operate on columns of pixels of the text image. The best path through a series of states is determined, corresponding to a score representing a degree to which a hidden Markov model for a hypothesis character fits the data locally.

After a set of feature functions has been defined, the OCR system can use conventional machine-learning techniques to compute associated weights that maximize system accuracy. In some implementations, the OCR system uses Minimum Error Rate Training (MERT) to learn the associated weights $\lambda_i$ of the feature functions $h_i$. MERT can be used to optimize the weights directly based performance of the system. MERT can be used, for example, to optimize for character error rate, word error rate, or any appropriate combination of the two. For example, the output of a decoder can be used to optimize the feature weights using Minimum Error Rate Training. In some implementations, the feature weights are optimized using a dataset of held out data different from a dataset used to build a feature table for computing feature values.

Figure 3:
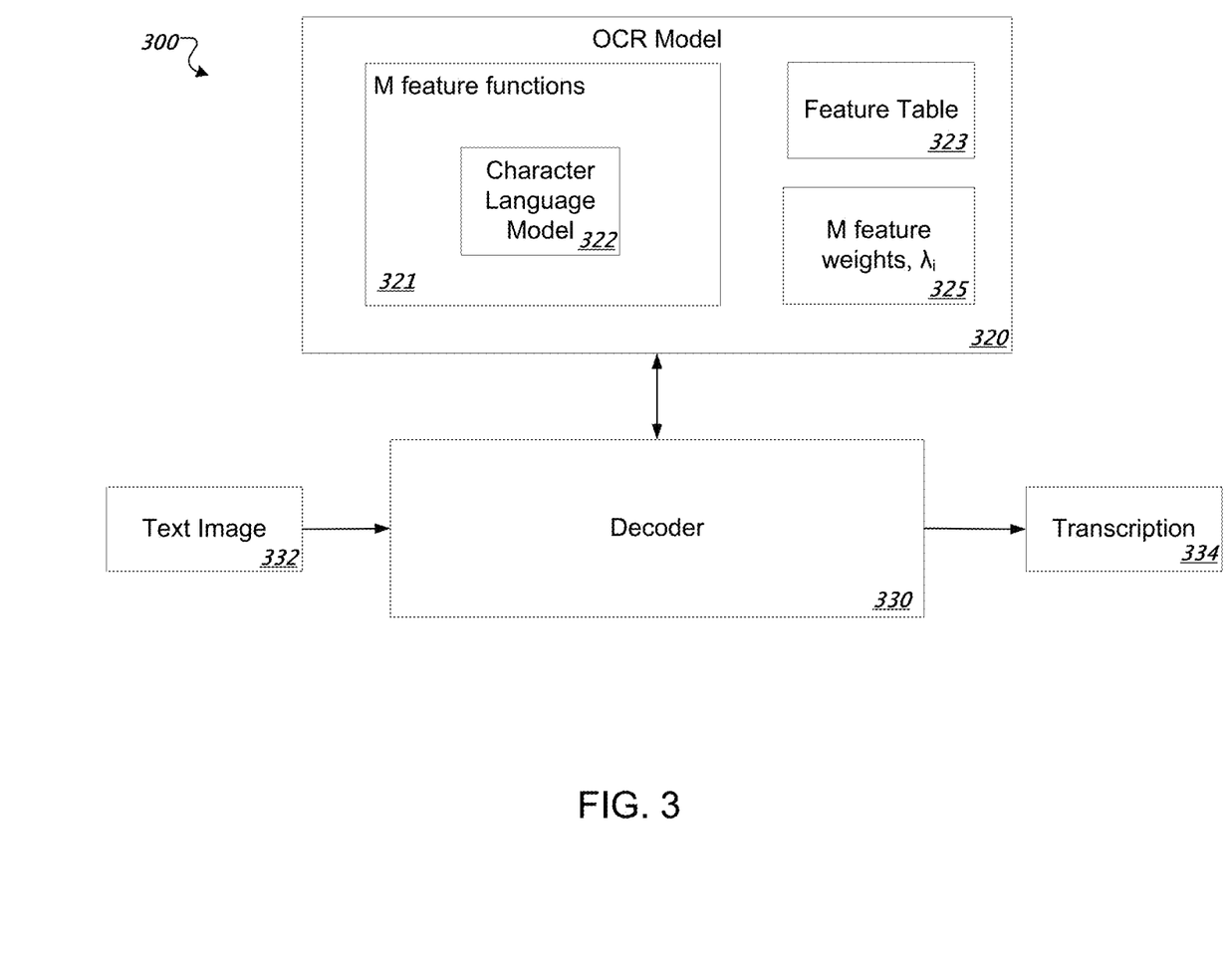
FIG. 3 is a diagram of an example system for optical character recognition according to embodiments of the described subject matter.

FIG. 3 is a diagram of an example system 300 for optical character recognition. The system illustrated in FIG. 3 can implement a log linear model as described above. The components of system 300 include an OCR model 320 and a decoder 330. The components of the system 300 can be implemented as computer programs installed on one or more computers.

The OCR model 320 includes M feature functions 321, which can include a character language model 322, projection-based feature functions as described above, in addition to others. Each feature function has an associated weight $\lambda_i$ 325.

The decoder 330 receives a text image 332 and determines an output transcription 334 having a lowest cost using the trained OCR model 320.

During training, the system receives text images and corresponding transcriptions of the text images. The text images can include segmentation or bounding box information indicating the locations of characters. The system can process an image of one or more characters to compute feature values for each of the M feature functions 321.

For some feature functions, co-occurrence information between computed feature values and particular characters can be stored in a feature table 323. For example, each of N projections $p_k$ can be used to compute the feature values for $h_{k,CEF}$ and $h_{k,CFE}$ as described above. These feature values can be stored in the feature table 323 as a {key, value} pair, where the key is a {k,$p_k(S_i)$} pair, with each k identifying a distinct row or column and $p_k(S_i)$ being the encoded row or column projection (e.g. "0001000000"). Each value of the {key, value} pair in the feature table identifies a character $t_i$ and a score. For example, the projection feature function $h_{k,CEF}$ can have a corresponding value of the {key, value} pair in the feature table that includes:

$$\left\{ t_i, \log \frac{\text{Count}(k, p_k(S_i), t_i)}{\text{Count}(k, p_k(S_i))} \right\},$$

where Count(k,$p_k(S_i)$,$t_i$) is a co-occurrence count between the character $t_i$ and the particular projection encoding $p_k(S_i)$ of projection k, and Count(k,$p_k(S_i)$) is an occurrence count of the projection pair {k,$p_k(S_i)$}. Similarly, the projection feature function $h_{k,CFE}$ can have a corresponding value of the {key, value} pair in the feature table that includes $$\left\{ t_i, \log \frac{\text{Count}(k, p_k(S_i), t_i)}{\text{Count}(t_i)} \right\},$$

where Count($t_i$) is an occurrence count of the character $t_i$. Each feature function in the system can have an analogous {key, value} pair in the feature table, such that for each computed feature value of an image segment $S_i$, a character and a score can be retrieved during decoding. Scores for feature functions that share the same keys can be stored together in the feature table.

Figure 4:
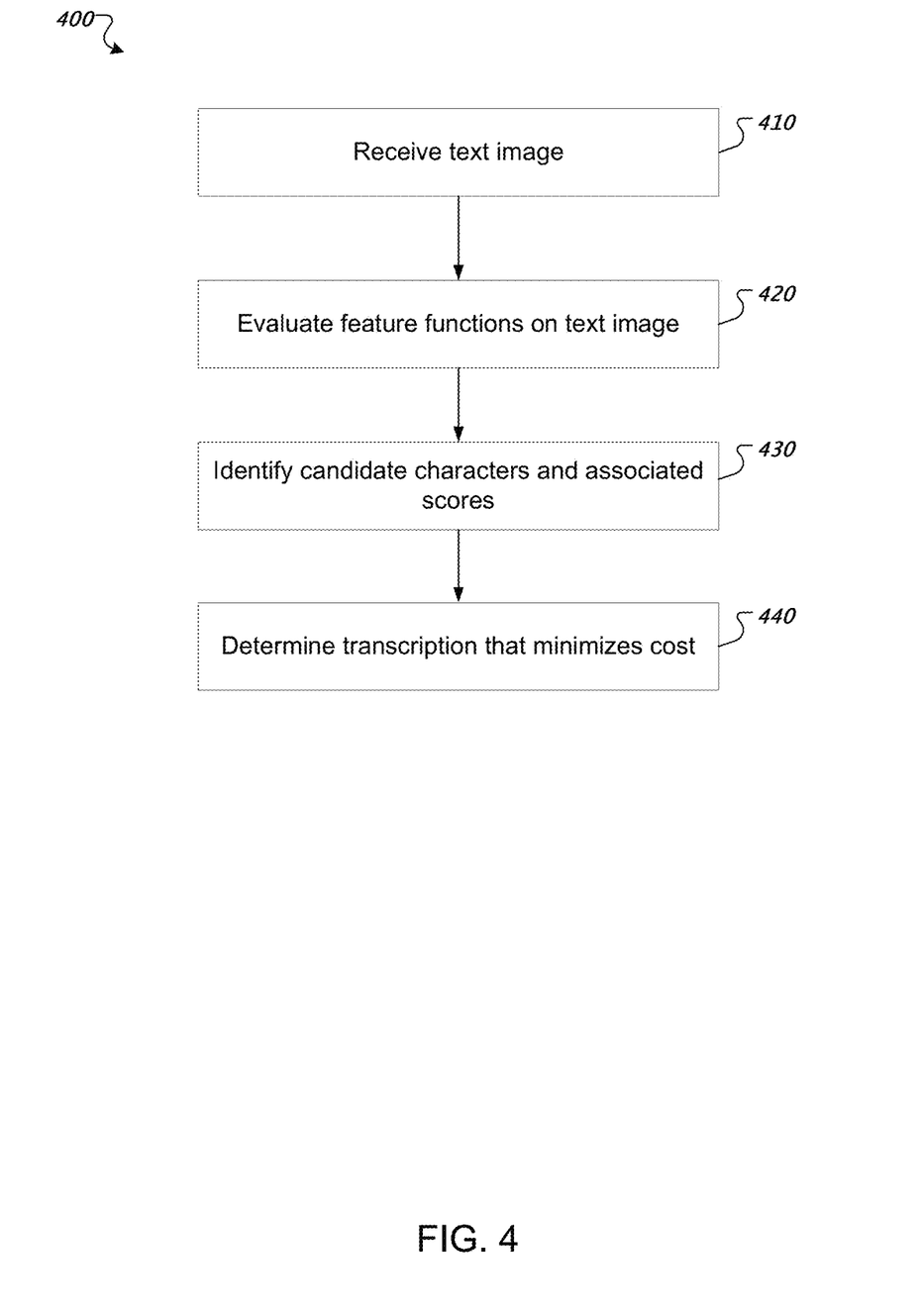
FIG. 4 is a flow chart of an example process for performing optical character recognition according to embodiments of the described subject matter.

FIG. 4 is a flow chart of an example process 400 for performing optical character recognition. Optical character recognition can be performed by a decoder, e.g., decoder 330 illustrated in FIG. 3. In general, the decoder receives a text image and produces a transcription that has a lowest computed cost according to a log linear model.

The decoder receives a text image (410). In some implementations, the segmentation or bounding boxes of the received text image are provided with the received text image. In some other implementations, a preprocessing stage determines a segmentation of the input text image.

The decoder evaluates feature functions for the image (420). Feature functions can be evaluated on the entire text image, individual image segments, or on image pixel columns. Evaluating feature functions results in a set of feature values for the image. The feature functions can, for example, be based on row and column projections of an image segment, as described above. The feature functions can also be based on other OCR approaches such as Document Image Decoding and a Hidden Markov Model, as described above. The feature functions can additionally be defined to compute global image feature values, for example, an average gray value of the image or the image width.

The decoder identifies candidate characters and associated scores (430). In some implementations, the determined feature values can be used as keys to a feature table to identify scores for each of one or more candidate characters for each of one or more image segments, as described above. Other feature values, e.g. as given by a language model, can be used directly as scores.

The decoder can compute a combined score for each identified candidate character according to the feature functions and weights of a log linear model. Computing the combined score can be done by combining the scores obtained from the feature table and weighting the scores by the associated feature weights. In some implementations, the feature values can be defined as $-\log(\cdot)$ values such that the combined score is a cost associated with each candidate character in a transcription. The decoder can then perform a search for the transcription that results in the lowest computed cost.

The set of candidate characters and associated costs can be used to construct a lattice. Each candidate character is a node in the lattice, and each path through the lattice is a candidate transcription. Each edge in the lattice is associated with a cost determined from feature values for a character in a candidate transcription corresponding to a path in the lattice. The lattice can then be searched to determine a path with the lowest cost (or the path with the highest transcription score).

Figure 5:
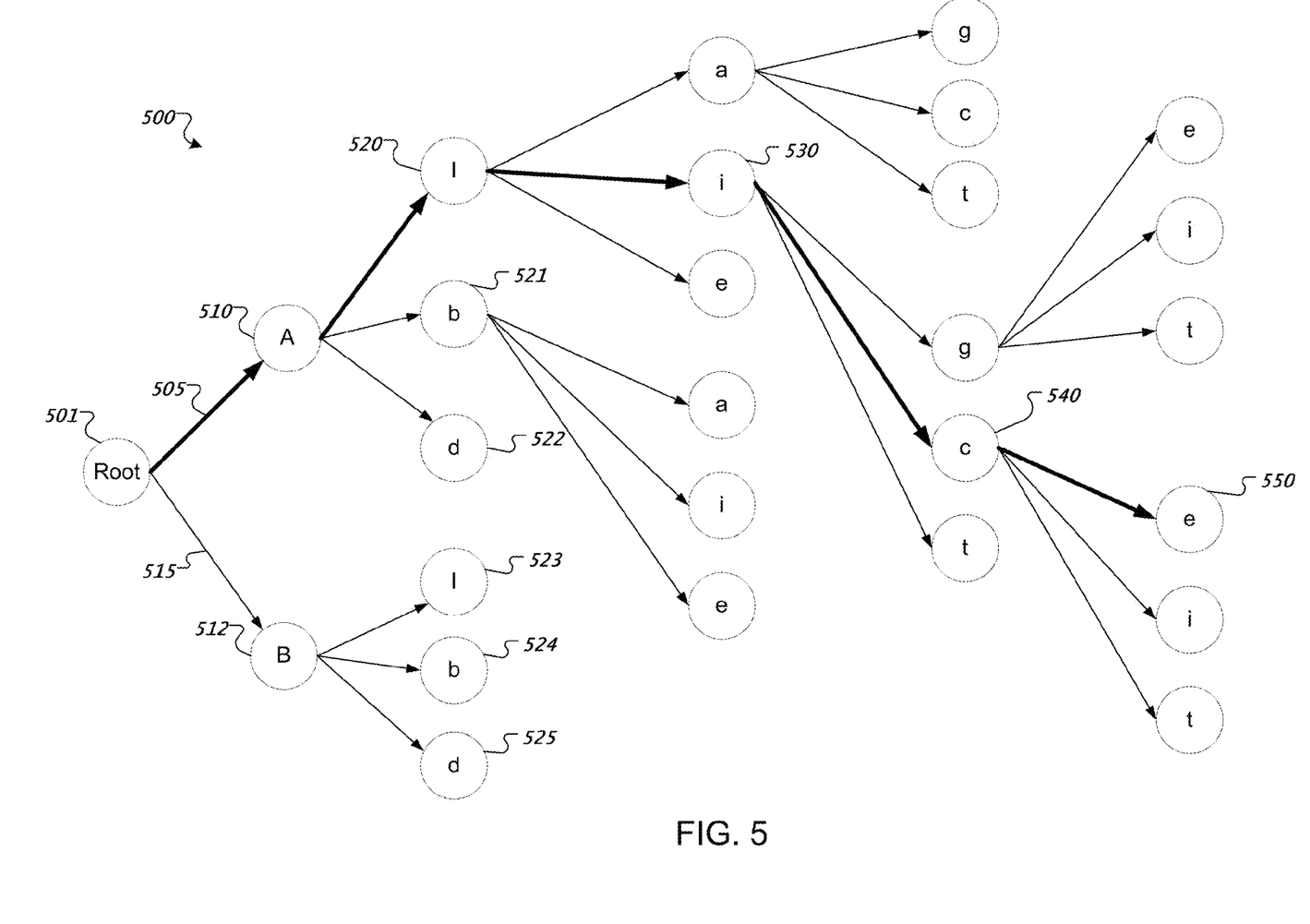
FIG. 5 is a diagram of an example lattice according to embodiments of the described subject matter.

FIG. 5 is a diagram of an example lattice 500. The example lattice 500 is constructed using candidate characters as nodes and by associating costs for each subsequent candidate character in a candidate transcription with each edge. A search algorithm can be used, by a decoder, for example, to traverse the lattice in order to determine a path with the lowest cost or highest transcription score based on the costs associated with edges of the lattice. Candidate characters on the determined path with the lowest cost can then be output as a transcription.

After constructing the lattice, a decoder can traverse the search lattice using any appropriate lattice traversal algorithm in order to determine a path with a lowest cost. In some implementations, the decoder uses a conventional beam search algorithm, which can apply a heuristic at each node on a path and where only a subset of possible paths are traversed.

For example, a beam search can start from a root node 501. Candidate characters can be identified using computed feature values for the text image. For example, candidate characters 510 and 512 can be identified for a first image segment. Obtained scores for each respective candidate character in a transcription can be used to associate costs with each edge 505 and 515 from the root node 501.

If a particular candidate character was not observed to co-occur with particular feature values during training, the combined score for the candidate character may be zero. Thus, an edge's associated cost for the candidate character may be infinite. In some implementations, in order to smooth infinite edge costs, the edge can instead be assigned a maximum cost.

The beam search can then search the lattice for subsequent candidate characters in a transcription. For example, candidate character nodes 520-525 can be traversed by the search using feature values computed for a next image segment. Obtained scores for each respective candidate character 520-525 can be used to associate costs with edges to each candidate character node.

For each next set of candidate characters, the beam search algorithm can search only a subset of possible paths, referred to as the beam width. For example, if the beam width is 2, at each next character, the beam search algorithm can search paths only from two candidate character nodes with the two lowest costs. For example, at the third character, the lattice can be searched only from two candidate character nodes with the two lowest costs, e.g., nodes 520 and 521. Similarly, for the fourth and fifth characters, the lattice can be searched only from paths with the lowest costs.

By traversing the lattice, the search algorithm determines a path with the lowest cost. For example, the path with the lowest cost through the lattice in FIG. 5 is illustrated by the bolded path through nodes 510, 520, 530, 540, and 550. Candidate nodes along the path with the lowest cost correspond to a candidate transcription of the text image. In this example, the bolded path corresponds to the candidate transcription "Alice."

Referring back to FIG. 4, the decoder determines a transcription that minimizes a cost (440). For example, the decoder can traverse a lattice constructed with obtained candidate characters and associated scores. After traversing the lattice, the decoder can output a candidate transcription that resulted from a path with a least cost or a highest transcription score.

Figure 6:
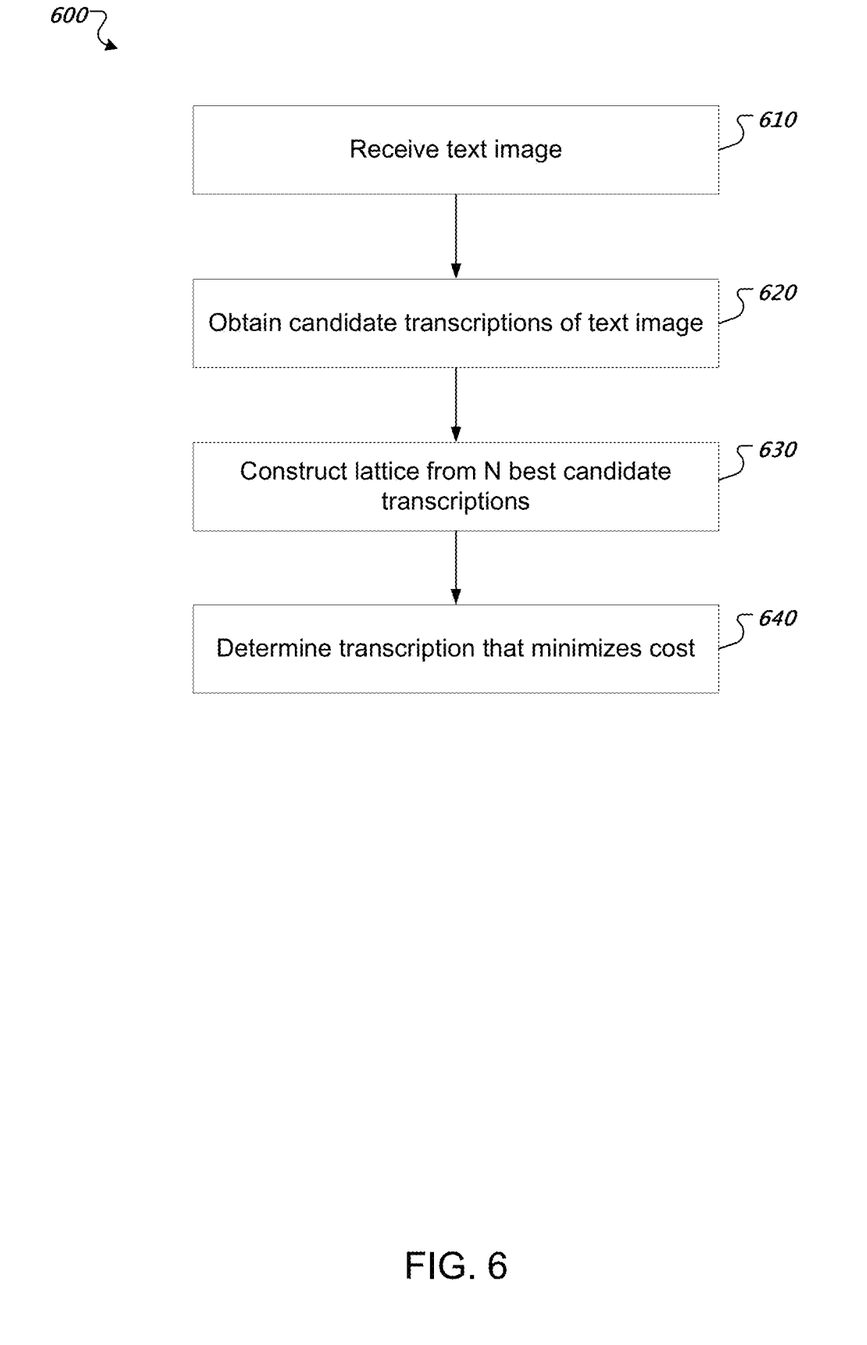
FIG. 6 is a flow chart of an example process for performing optical character recognition according to embodiments of the described subject matter.

FIG. 6 is a flow chart of an example process 600 for performing optical character recognition. The process 600 is an example of a two-pass approach to performing optical character recognition using a log-linear model. In general, the log-linear model is used to evaluate characters from a number of obtained candidate transcriptions. The process 600 will be described as being performed by a system of one or more computers.

The system receives a text image (610). The system obtains candidate transcriptions of the text image (620). The system can use any appropriate OCR technique to obtain transcriptions of the text image, including transcriptions obtained from conventional OCR systems.

The system constructs a lattice from N best candidate transcriptions (630). Each node in the lattice corresponds to a character in a candidate transcription. Feature functions of the log linear model are evaluated to determine a cost associated with each character. Edges of the lattice are associated with the determined costs for each subsequent character in the candidate transcriptions. The lattice can then be searched to determine a path with the lowest cost.

Figure 7:
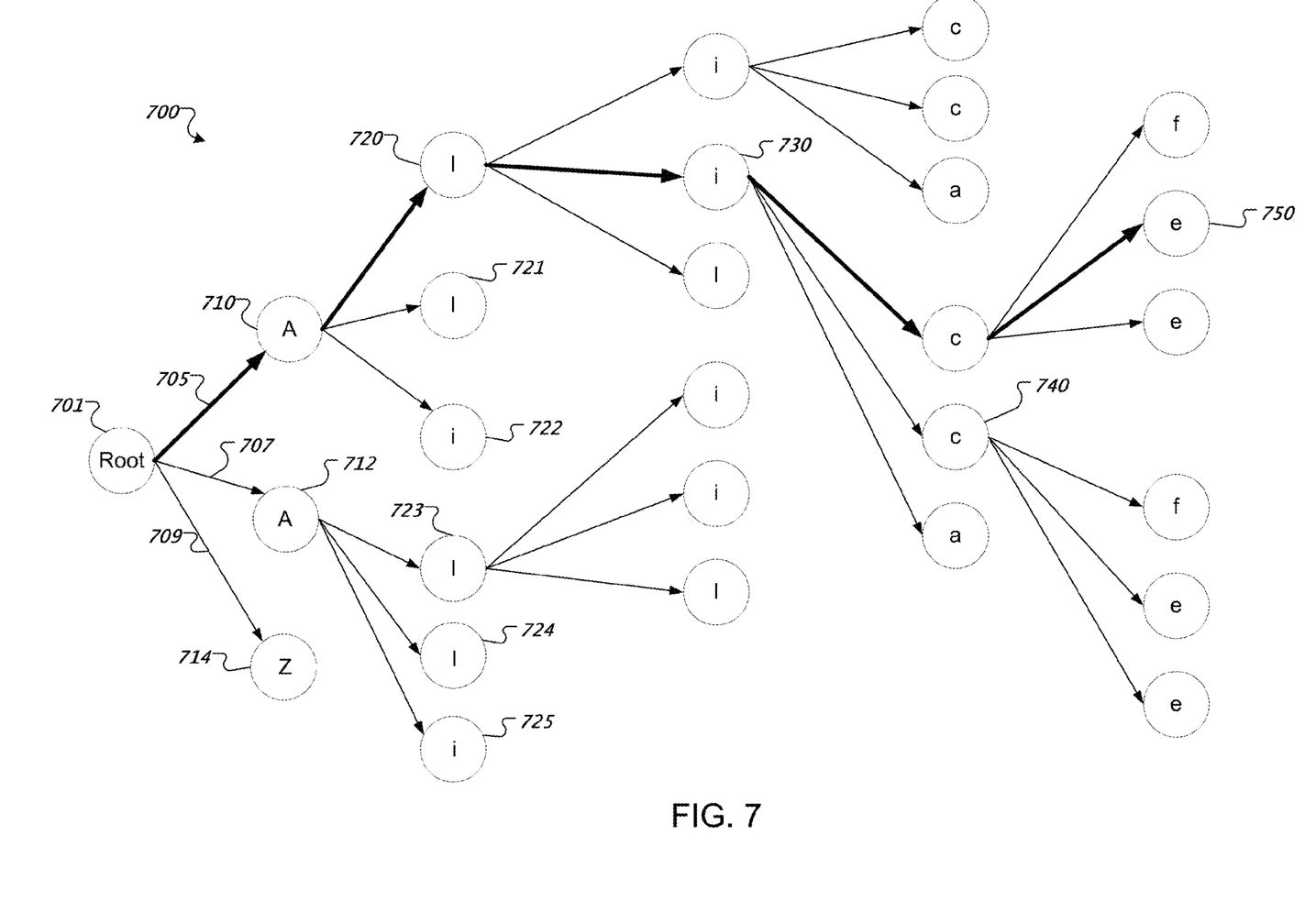
FIG. 7 is a diagram of an example lattice according to embodiments of the described subject matter.

FIG. 7 is a diagram of an example lattice 700. The example lattice 700 can be constructed during the second pass of a two-pass OCR approach. A search algorithm, e.g. a beam search algorithm, can be used to traverse the lattice in order to determine a path with the lowest cost based on costs associated with edges of the lattice. Candidate characters on the determined path with the lowest cost can then be output as a transcription.

At each step in the lattice, candidate characters are identified from each subsequent segment of the N best candidate transcriptions obtained in a first pass. For example, in FIG. 7 the lattice can be constructed using three candidate transcriptions "Alicf," "Aiice," and "Zlice." Scores for each of the characters from the candidate transcriptions can be determined using scores computed from a feature table, as described above.

The search can start at node 701. Candidate characters for a first image segment can be identified from corresponding first characters in the obtained candidate transcriptions. For example, candidate characters 710 ("A"), 712 ("A"), and 714 ("Z") can be identified from first characters of the example candidate transcriptions.

Scores for each of these candidate characters can be obtained by computing feature functions on the corresponding image segment from the received text image. For example, edges 705 and 707 can be associated with the determined cost for "A," and edge 709 can be associated with the determined cost for "Z."

A search algorithm, e.g. beam search, can then search the lattice for the next image segment using the next characters from the obtained candidate transcriptions, in this example, "I," "l," and "i." With a beam width of 2, the beam search searches the lattice only from nodes 710 and 712 by adding nodes 720-725.

By traversing the lattice, the search algorithm determines a path with the lowest cost. For example, the path with the lowest cost through the lattice in FIG. 7 is illustrated by the bolded path through nodes 710, 720, 730, 740, and 750. The system can thus obtain the correct transcription "Alice" even though none of the candidate transcriptions alone were a correct transcription.

Referring back to FIG. 6, the system determines a transcription that minimizes a cost (640). For example, the system can traverse a lattice constructed in the previous step from characters in the obtained candidate transcriptions. The system can then output a transcription that resulted from a path with the lowest cost.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, for example, web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
   one or more computers; and
   one or more storage devices storing instructions that, when executed by the one or more computers, cause the one or more computers to perform operations comprising:
   receiving a text image divided into one or more image segments;
   evaluating a set of feature functions for a log linear model to determine respective feature values for each image segment of the text image, wherein each feature function $h_i$ maps each image segment $S_i$ to a feature value, and wherein each feature function $h_i$ is associated with a respective feature weight $\lambda_i$;
   identifying one or more candidate characters for each image segment, wherein the candidate characters are identified using the determined feature values for the corresponding image segment, and wherein each identified candidate character has an associated score determined according to feature functions and weights of the log linear model, and wherein the candidate characters are identified using a feature table that stores co-occurrence counts between characters and feature values,
   wherein feature values in the feature table comprise a first feature value computed from a co-occurrence count of a character $t_j$ in training data with a k-th row or column projection $p_k$ of an image segment $S_i$ corresponding to character $t_j$, wherein the first feature value is based at least on part on:

$\log(\text{Count}(p_k(S_i), t_j))$, wherein feature values in the feature table comprise a second feature value computed based on a character language model, wherein the second feature value corresponds to a probability for a given input character based one or more previous characters; and
   determining, by application of a search function, a transcription that minimizes a cost for the text image according to the log linear model, wherein the transcription is a sequence of identified candidate characters, one candidate character for each image segment, wherein the search function performs a beam search through a lattice of nodes and directed edges, wherein each node corresponds to one of the identified candidate characters and each edge to a node is associated with the score associated with the node.

2. A computer-implemented method comprising:
receiving a text image I;
evaluating a set of feature functions for a log linear model to determine respective feature values for the text image I, wherein each feature function $h_i$ maps the text image I to a feature value, and wherein each feature function $h_i$ is associated with a respective feature weight $\lambda_i$; and
determining a transcription $\hat{T}$ that minimizes a cost of the log linear model.

3. The method of claim 2, wherein determining a transcription $\hat{T}$ comprises determining a transcription $T$ that minimizes a cost for the log linear model over transcriptions T according to:

$$\hat{T} = \underset{T}{\operatorname{argmax}} \sum_{i=1}^{M} \lambda_i h_i(T, I).$$

4. The method of claim 2, wherein determining a transcription $\hat{T}$ comprises determining a transcription $T$ that minimizes a cost for the log linear model over pairs of transcriptions T and image segmentations S according to:

$$\hat{T} = \underset{T,S}{\operatorname{argmax}} \sum_{i=1}^{M} \lambda_i h_i(T, S, I).$$

5. The method of claim 2, further comprising:
identifying one or more candidate characters for each of one or more image segments of the text image, wherein the candidate characters are identified using the determined feature values for the corresponding image segment, and wherein each identified candidate character has an associated score determined according to the log linear model, and
wherein determining, by result of a search function, a transcription T comprises identifying a sequence of identified candidate characters, one candidate character for each image segment, that produces a highest transcription score.

6. The method of claim 2, further comprising:
identifying one or more candidate characters for each of one or more image segments of the text image, wherein the candidate characters are identified from a set of candidate transcriptions, and wherein each identified candidate character has an associated score determined according to the log linear model, and
wherein determining, by result of a search function, a transcription T comprises identifying a sequence of identified candidate characters, one candidate character for each image segment, that produces a highest transcription score.

7. The method of claim 5, wherein the identified candidate characters are identified from a feature table that stores co-occurrence counts between characters and feature values.

8. The method of claim 7, wherein feature values in the feature table comprise a first feature value computed from a co-occurrence count of a character $t_i$ in training data with a k-th row or column projection $p_k$ of an image segment $S_i$ corresponding to character $t_i$.

9. The method of claim 8, wherein the first feature value is given by a first feature function defined by:

$$\log \frac{\operatorname{Count}(p_k(S_i), t_i)}{\operatorname{Count}(p_k(S_i))}.$$

10. The method of claim 8, wherein the first feature value is given by a first feature function defined by:

$$\log \frac{\operatorname{Count}(p_k(S_i), t_i)}{\operatorname{Count}(t_i)}.$$

11. The method of claim 5, wherein the search algorithm performs a beam search through a lattice, wherein the lattice comprises nodes of each of the identified candidate characters for each image segment and edges of each associated score.

12. The method of claim 2, wherein the feature functions comprise a first feature function that is based on a character language model, wherein a first feature value for the first feature function corresponds to a probability for a given input character based one or more previous characters.

13. The method of claim 2, wherein the feature functions comprise a first feature function that is based on a document image decoding model.

14. The method of claim 2, wherein the feature functions comprise a first feature function that is based on a hidden Markov model.

15. A system comprising:
one or more computers; and
one or more storage devices storing instructions that, when executed by the one or more computers, cause the one or more computers to perform operations comprising:
receiving a text image I;
evaluating a set of feature functions for a log linear model to determine respective feature values for the text image I, wherein each feature function $h_i$ maps the text image I to a feature value, and wherein each feature function $h_i$ is associated with a respective feature weight $\lambda_i$; and
determining a transcription $\hat{T}$ that minimizes a cost of the log linear model.

16. The system of claim 15, wherein the operations further comprise:
identifying one or more candidate characters for each of one or more image segments of the text image, wherein the candidate characters are identified using the determined feature values for the corresponding image segment, and wherein each identified candidate character has an associated score determined according to the log linear model, and
wherein determining, by result of a search function, a transcription T comprises identifying a sequence of identified candidate characters, one candidate character for each image segment, that produces a highest transcription score.

17. The system of claim 16, wherein feature values are identified from a feature table, and wherein the feature values comprise a first feature value computed from a co-occurrence count of a character $t_i$ in training data with a k-th row or column projection $p_k$ of an image segment $S_i$ corresponding to character $t_i$.

18. The system of claim 17, wherein the first feature value is given by a first feature function defined by:

$$\log\frac{\text{Count}(p_k(S_i), t_i)}{\text{Count}(p_k(S_i))}.$$

19. The system of claim 17, wherein the first feature value is given by a first feature function defined by:

$$\log\frac{\text{Count}(p_k(S_i), t_i)}{\text{Count}(t_i)}.$$

20. The system of claim 15, wherein the search algorithm performs a beam search through a lattice, wherein the lattice comprises each of the identified candidate characters for each image segment and each associated score.

* * * * *